United States Patent [19]
Cybulski et al.

[11] 4,330,049
[45] May 18, 1982

[54] DISC BRAKE ASSEMBLY AND RESILIENT MEMBER THEREFOR

[75] Inventors: Mark J. Cybulski; Bert A. Gumkowski, both of South Bend; Larry A. Portolese, Granger, all of Ind.

[73] Assignee: The Bendix Corporation, Southfield, Mich.

[21] Appl. No.: 116,126

[22] Filed: Jan. 28, 1980

[51] Int. Cl.³ .................. F16D 65/09; F16D 65/40
[52] U.S. Cl. .................... 188/73.36; 188/73.38; 188/73.39; 188/73.45; 188/205 A; 188/73.34
[58] Field of Search .................... 188/73.3, 73.4, 73.5, 188/73.6, 72.3, 216, 205 A, 206 R, 72.4, 72.5, 73.1, 250 E, 250 B

[56] References Cited

U.S. PATENT DOCUMENTS

| 3,625,314 | 12/1971 | Rinker | 188/73.3 X |
| 3,865,215 | 2/1975 | Burgdorf et al. | 188/73.6 |
| 3,958,668 | 5/1976 | Kestermeier et al. | 188/23.4 |
| 4,068,744 | 1/1978 | Markert | 188/73.3 |
| 4,119,180 | 10/1978 | Horie | 188/73.5 |
| 4,194,597 | 3/1980 | Evans et al. | 188/73.5 |

FOREIGN PATENT DOCUMENTS

| 2049035 | 4/1971 | Fed. Rep. of Germany . |
| 2711729 | 9/1977 | Fed. Rep. of Germany . |
| 2713360 | 9/1977 | Fed. Rep. of Germany . |
| 2252035 | 6/1975 | France . |

Primary Examiner—Douglas C. Butler
Attorney, Agent, or Firm—Paul David Schoenle; Ken C. Decker

[57] ABSTRACT

A disc brake assembly includes a caliper assembly which is operable to bias a pair of friction elements into engagement with a rotor. At least one resilient member cooperates with the caliper assembly and the pair of friction elements to releasably couple the latter to the caliper assembly. In addition, the one resilient member cooperates with the caliper assembly and one of the pair of friction elements to define an interlocking fit preventing movement of the caliper assembly in a radial direction relative to the rotor.

17 Claims, 3 Drawing Figures

DISC BRAKE ASSEMBLY AND RESILIENT MEMBER THEREFOR

The present invention relates to disc brake assemblies wherein a pair of friction elements are movable by a caliper assembly during a brake application. A support member defines a pair of circumferentially spaced arms which are engageable with the pair of friction elements to absorb braking torque. U.S. Pat. Nos. 3,625,314, 4,068,744 and 4,119,180 show such brake assemblies.

During a brake application, a rotatable member, such as a disc, engages the friction elements to bias the latter to rotate with the rotatable member. Therefore, a leading end of the friction elements will be forced upward relative to a leading spaced arm while a trailing end of the friction elements will be forced downward relative to a trailing spaced arm. This action creates a moment for the pair of friction elements. In addition, a force is imparted to the caliper assembly by the action of fluid pressure within a pressure chamber on the caliper assembly to bias the latter to move transverse to the disc, thereby bringing the pair of friction elements into engagement with the disc. The combination of the caliper housing forces and the moment for the pair of friction elements creates a force on the caliper housing biasing the latter to move radially outwardly away from the disc. This combination results from the cooperation of forces generated by a piston within the caliper and by the pair of friction elements during braking. In particular, the portion of the caliper assembly opposite the pressure chamber tends to tilt radially outwardly away from the disc.

When the caliper assembly is permitted to tilt in the manner described above, the outer friction element opposite the pressure chamber is also tilted slightly so that it wears unevenly. Consequently, the life of the outer friction element is shortened, to say nothing of the loss in braking efficiency. Moreover, the tilting caliper also causes the inner friction element adjacent the pressure chamber to wear unevenly, albeit to a lesser degree. In the worst case, the tilting caliper might interfere with a rim of a wheel assembly, thereby damaging the rim during a brake application.

The present invention provides a simple solution to the aforegoing problem with a resilient member defining an interlocking fit connecting the caliper assembly to the support member to substantially prevent the caliper application from tilting during a brake assembly. The resilient member is releasably coupled to the caliper assembly and engageable with the pair of friction elements to retain the latter connected with the caliper assembly before the caliper assembly is assembled with the support assembly. At least one of the pair of friction elements defines a first interlocking fit with the spaced arm of the support member. The first interlocking fit permits the one friction element to move transversely relative to the disc but prevents radial movement relative to the disc. The resilient member defines a second interlocking fit between the caliper assembly and the one friction element to substantially prevent the caliper assembly from moving radially outwardly relative to the one friction element and the spaced arm of the support member.

In a preferred embodiment a pair of resilient members cooperates with the caliper assembly to connect the pair of friction elements thereto. Each resilient member defines interlocking connections between the caliper assembly and the pair of friction elements and at least one of the pair of friction elements defines interlocking connections with at least one of the the pair of circumferentially spaced arms of the support member. Each resilient member extends substantially axially within a clearance between the caliper assembly and each spaced arm. A bent portion on each axially extending resilient member is engageable with the caliper assembly to preload each resilient member. The resilient members bias the pair of friction elements radially outwardly to engage with the caliper assembly or the spaced arms to eliminate rattle or noise generated by the pair of friction elements.

It is an advantageous effect of the present invention that at least one resilient member couples a pair of friction elements to a caliper assembly while also cooperating with the friction elements and caliper assembly to define an interlocking fit preventing radially outward movement of the caliper assembly relative to the friction elements.

The invention will now be described by way of example, with reference to the accompanying drawings in which.

Figure 1:
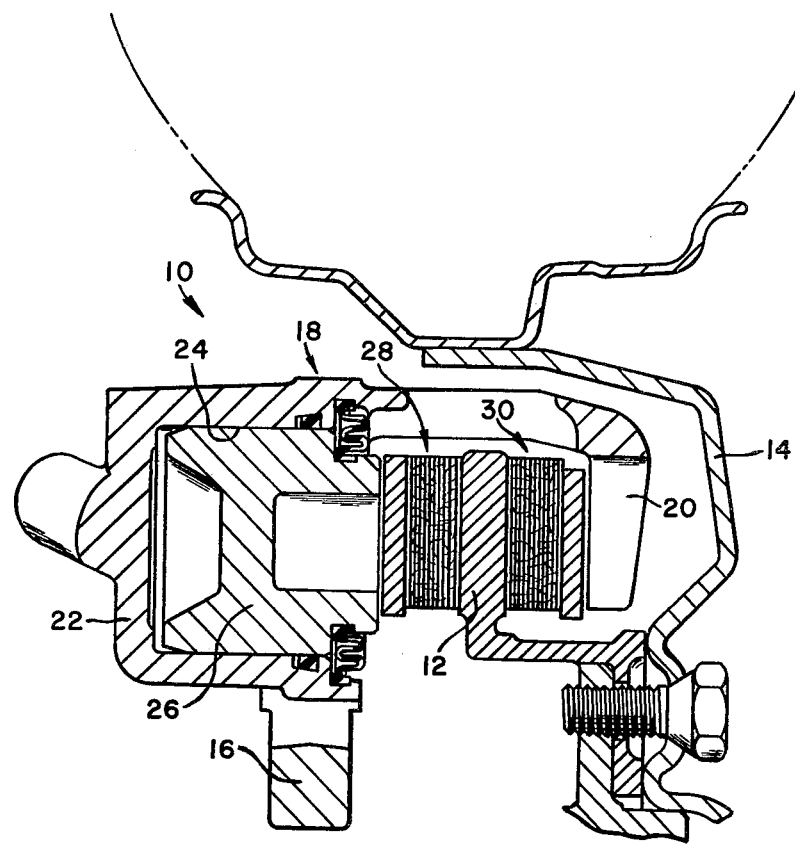
FIG. 1 is a front cross-sectional view of a disc brake assembly.

A disc brake assembly 10 shown on FIG. 1 includes a disc or rotor 12 rotatable with a wheel assembly 14 to be braked. A support member 16 movably mounts a caliper assembly 18 having an outer leg 20 on one side of the rotor 12 and an inner leg 22 on the other side of the rotor 12. The leg 22 defines a cylinder 24 receiving a piston 26 so that fluid pressure within the cylinder 24 causes the piston 26 to move toward the rotor 12 while the remaining parts of the caliper assembly move in the opposite direction. Consequently, a pair of friction elements 28 and 30 are moved into frictional engagement with the rotor during a brake application.

Figure 2:
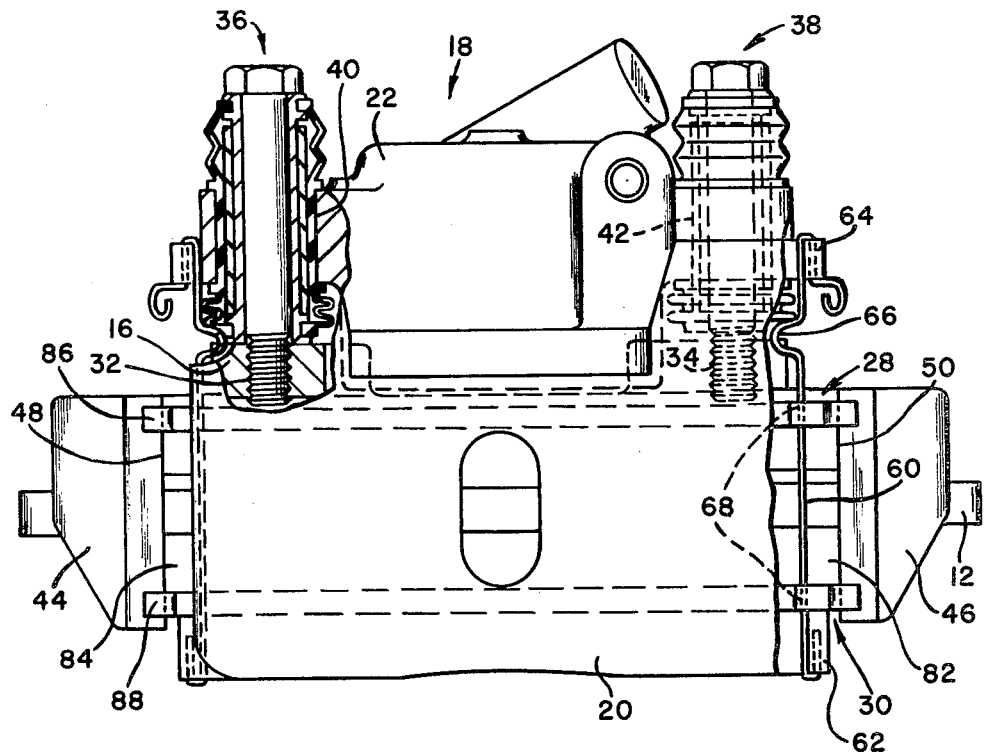
FIG. 2 is a top view of FIG. 1 showing the present invention.

Turning to FIG. 2, the support member includes threaded openings 32 and 34 which secure pin assemblies 36 and 38 and the caliper leg 22 is apertured at 40 and 42 for the purpose of movably mounting the caliper assembly on the pin assemblies 36 and 38. In addition, the support member includes axially extending arms 44 and 46 which are circumferentially spaced on opposite sides of the caliper assembly. Each arm defines surfaces 48 and 50 which are engageable with each friction element to absorb braking torque during braking. If the forward rotation of the rotor is from right to left in FIG. 2, then the arm 46 is a leading arm and the arm 44 is a trailing arm. Regardless the direction of rotation for the rotor, the torque developed during braking will be transferred to the support arms so that the caliper assembly absorbs only a slight amount of torque.

Figure 3:
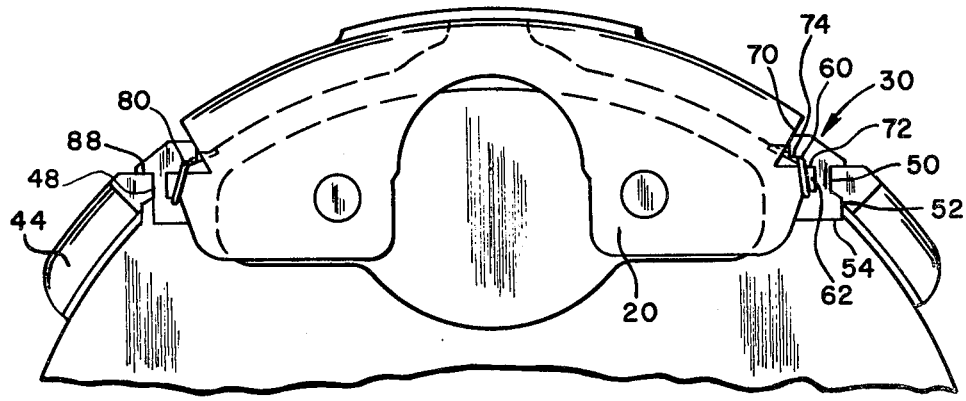
FIG. 3 is a side view of FIG. 2.

In accordance with the invention, it is seen in FIG. 3 that the leading arm surface 50 is provided with a recess 52 opening toward the friction element 30. The pair of friction elements 28 and 30 terminate in matching surfaces so that FIG. 3 shows a projection 54 on friction element 30 which extends into the recess 52. Consequently, the pair of friction elements cooperates with the arm 46 to define an interlocking fit substantially preventing radial movement of the pair of friction elements relative to the arm 46. A resilient member 60 shown more clearly in the cutaway portion of FIG. 2 is releasably connected to the caliper assembly via caliper projections 62 and 64 disposed on opposite sides of the rotor 12. The resilient member 60 extends axially between the projections except for a bent portion 66 which is engageable with the underside of the caliper to impart a preload to the resilient member. Each friction element is provided with a cutout 68 opening toward the caliper assembly and the resilient member 60 is disposed within the cutout 68 closest to the arm 46. Therefore, the resilient member 60 biases the friction elements upward viewing FIG. 3 to engage the friction elements with either a side edge 70 on the caliper assembly 18 or with the top wall of recess 52. The friction element 30 is disposed adjacent the projection 62 and the resilient member 60 engages a top surface 72 of the projection 62 and also a top wall 74 of cutout 68 to define another interlocking fit. The other interlocking fit substantially prevents radial outward movement of the caliper leg 20 relative to the friction element 30.

In a similar manner another resilient member 80 cooperates with the trailing end of the pair of friction elements to releasably connect the friction elements to the caliper assembly. However, the trailing end of the pair of friction elements does not form an interlocking fit with the trailing arm 44. In order to assemble the caliper assembly and pair of friction elements to the support member, the projection 54 of the leading end is inserted into the recess 52, the pair of friction elements while connected to the caliper assembly are rotated counter-clockwise viewing FIG. 3 until the trailing end of the friction elements is engaging the trailing arm 44, and the pin assemblies 36 and 38 are inserted through apertures 40 and 42 to fasten with openings 32 and 34. When the caliper assembly is attached to the support member, the resilient members 60 and 80 are disposed within respective clearances 82 and 84 between side edges of the caliper assembly and the circumferentially spaced arms.

When the rotor is rotating counter-clockwise viewing FIG. 3, a vehicle incorporating the disc brake assembly 10 is traveling in a forward direction. Upon a brake application, fluid pressure is communicated to the cylinder 24. The piston 26 is moved toward the rotor to bias the inner friction element 28 into engagement with the rotor. A reaction force created by the friction element 28 engaging the rotor biases the caliper assembly 18 to move on the pin assemblies in a direction opposite to the movement of the piston 26 so that the outer friction element 30 is also brought into engagement with the rotor. The leg 20 biases the outer friction element into engagement with the rotor. The rotating rotor 12 engages the leading ends of the friction elements 28 and 30 to bias the same to move upward viewing FIG. 3 away from the arm 46. However, the interlocking fit provided by projection 54 within recess 52 prevents the friction elements from moving upward. The rotating rotor 12 also engages the trailing end of the pair of friction elements to bias the latter to move downward, so that lips 86 and 88 on the friction elements are forced against the arm 44. Consequently, the arm 44 prevents the friction elements from moving downward. A trailing arm surface 48 on the arm 44 abuts the friction elements to absorb a majority of the torque developed by the frictional engagement between the rotor and friction elements.

In combination with the frictional forces absorbed by the outer friction element 30, the reaction forces on the caliper assembly generate a lifting force for the caliper leg 20 tending to move the leg 20 upward viewing FIG. 3. This lifting force is primarily located on that portion of the leg adjacent the leading end of the pair of friction elements. When the leg begins to move upward, the projection 62 forces the resilient member 60 into abutment with the wall 74 of friction element 30. Since the friction element is substantially locked to the arm 46, the wall 74 will be prevented from moving upward. Consequently, the resilient member will be substantially stationary to oppose lifting of the leg 20.

It is seen in FIG. 2 that each axial end of the resilient member 60 is U-shaped so that the resilient member can be carried by the projections 62 and 64 of the caliper assembly 18.

Although the interlocking fit between the friction element 30 and arm 46 is provided by a recess in the arm and a projection on the friction element it is feasible to provide a recess on the friction element and a projection on the arm. Many other modifications are also possible by one skilled in the art and, as such, are included within the scope of the appended claims.

We claim:

1. In a disc brake assembly having a pair of friction elements which are engageable with a rotatable member during a brake application, a caliper assembly cooperating with the pair of friction elements to urge the latter into engagement with the rotatable member during the brake application, a support assembly movably disposing the caliper assembly relative to the rotatable member, and a resilient member engageable with the caliper assembly and at least one of the pair of friction elements to yieldably oppose separation between the one friction element and the caliper assembly, characterized by the one friction element cooperating with the support assembly to substantially define a first interlocking fit which prevents radially outward movement of the one friction element relative to the support assembly, said caliper assembly defining a side edge confronting said support assembly in spaced relation thereto, said one friction element being engageable with said side edge to also substantially prevent radially outward movement of said one friction element, and said resilient member cooperating with said caliper assembly and with said one friction element to substantially define a second interlocking fit which prevents radially outward movement of said caliper assembly relative to said one friction element and said support assembly.

2. The disc brake assembly of claim 1 characterized by the support assembly including a pair of circumferentially spaced arms engageable with the pair of friction elements, one of said arms cooperating with the one friction element to substantially define the first interlocking fit.

3. The disc brake assembly of claim 1 characterized by the one friction element including a first abutment surface, the caliper assembly including a second abutment surface adjacent to said first abutment surface and the resilient member is engageable with both abutment surfaces.

4. The disc brake assembly of claim 3 characterized by the one friction element including a backing plate with at least one ear extending substantially outwardly from the caliper assembly, and said one ear including a recess defining said first abutment surface.

5. The disc brake assembly of claim 1 characterized by the caliper assembly defining a pair of circumferentially spaced side edges adjacent to but spaced from the support assembly and the resilient member is disposed between one of said side edges and the support assembly.

6. The disc brake assembly of claim 5 further characterized by another resilient member being disposed between said other side edge and the support assembly.

7. The disc brake assembly of claim 1 characterized by the resilient member comprising an axially extending wire engageable with the pair of friction elements and carried by the caliper assembly.

8. The disc brake assembly of claim 1 characterized by the pair of friction elements being engageable with circumferentially spaced arms on the support member, the pair of friction elements cooperating with one of the circumferentially spaced arms to substantially define said first interlocking fit and the pair of friction elements cooperating with the other circumferentially spaced arm to substantially define a torque taking abutment.

9. In a disc brake assembly having a rotor, the combination of, a support member having a pair of circumferentially spaced arms, a pair of friction elements engageable with the spaced arms to transmit torque thereto during a brake application, a caliper assembly movably mounted on the support member and cooperating with the pair of friction elements to urge the latter from a nonbraking position to a braking position engaging the rotor during a brake application, and at least one resilient member yieldably biasing the pair of friction elements toward coupled relation with the caliper assembly, said caliper assembly defining an axially extending side edge which is engageable by each one of said pair of friction elements to define said coupled relation of said pair of friction elements with said caliper assembly, said side edge engaging said pair of friction elements to limit radially outward movement of the latter relative to said caliper assembly, at least one of the pair of friction elements terminating in an ear engageable with one of the spaced arms, the ear cooperating with the one spaced arm to substantially define an interlocking fit which limits movement of the one friction element radially outwardly from the rotor, the ear including a recess for receiving the one resilient member, and the one resilient member is engageable with the radially outer wall of the recess and the caliper assembly to limit movement of the caliper assembly radially outwardly from the rotor.

10. The disc brake assembly of claim 9 in which the caliper assembly includes axially spaced projections on opposite sides of the rotor and said projections releasably mount the one resilient member to the caliper assembly.

11. The disc brake assembly of claim 10 in which the one resilient member includes at least one bent portion intermediate the projections and the one bent portion is engageable with the caliper assembly to impart a preload on the one resilient member.

12. The disc brake assembly of claim 9 in which the one spaced arm and the friction element ear are normally leading members as opposed to trailing members, the leading members seeing a portion of the rotor before the trailing members as the rotor moves past the one friction element.

13. A disc brake comprising a brake disc which is rotatable about an axis, a nonrotatable support member disposed adjacent said brake disc and defining a pair of circumferentially spaced and axially extending arms which define a recess therebetween, a pair of friction elements received in said recess in torque-transferring abutting relationship with said pair of arms, each one of said pair of friction elements cooperating with one of said pair of arms to define an interlocking fit therewith, said interlocking fit substantially preventing radial movement of said pair of friction elements relative to said one arm while allowing axial relative movement therebetween, a caliper straddling both said brake disc and said pair of friction elements to urge the latter into engagement with said brake disc to retard rotation thereof, characterized by said caliper defining an axially extending side edge which is engageable with said pair of friction elements, each of said pair of friction elements defining one of a pair of axially aligning cutouts adjacent to said side edge and opening toward said caliper, said caliper defining a pair of axially spaced projections aligning with said pair of cutouts, and a resilient member extending between said pair of projections and through said pair of cutouts, said resilient member engaging said pair of friction elements to yieldably bias the latter toward engagement with said side edge.

14. A disc brake for an automotive vehicle comprising a brake disc which is rotatable about an axis, a nonrotatable support member disposed adjacent to said brake disc, said support member defining a pair of circumferentially spaced and axially extending arms which define a recess therebetween, one of said pair of arms being a leading arm with which any point on said brake disc first comes into radial alignment during forward motion of said vehicle, an inboard and outboard friction element disposed in said recess in torque-transmitting abutting relationship with said pair of arms, said outboard friction element cooperating with said leading arm to define an interlocking fit therebetween, said interlocking fit substantially preventing radial movement of said one friction element relative to said leading arm, a caliper received in said recess, said caliper including a pair of legs straddling said pair of friction elements, one of said pair of legs being an outboard leg cooperating with said outboard friction element to urge the latter into frictional engagement with said brake disc to effect a brake application, said caliper defining a side edge confronting said leading arm in spaced relation thereto, said side edge being engageable by said outboard friction element to support said caliper from said leading arm via said interlocking fit so as to substantially prevent radially inward movement of said caliper relative to said leading arm.

15. The invention of claim 14 wherein said outboard friction element and said caliper define cooperating means for forming another interlocking fit therebetween, said other interlocking fit between said caliper and said friction element substantially preventing radially outward movement of said outboard leg of said caliper relative to said leading arm during said brake application.

16. The invention of 15 wherein said cooperating means include a circumferentially extending cutout defined by said outboard friction element and opening toward said caliper, a pair of axially spaced and circumferentially extending projections defined by said caliper and aligning with said cutout, the outboard one of said pair of projections being defined by said outboard leg, and an elongate resilient member extending axially between said pair of projections and through said cutout, said resilient member engaging a radially outer wall of said cutout of said outboard friction element to bias the latter toward engagement with said side edge, and said resilient member engaging a radially outer surface of said outboard projection to substantially prevent radially outward movement of said outboard caliper leg during said brake application.

17. In a disc brake of the type including a brake disc which is rotatable about an axis, a pair of friction elements disposed on opposite sides of said brake disc, and a caliper straddling said brake disc and cooperating with said pair of friction elements to urge the latter into engagement with said brake disc to retard rotation thereof, the improvement therein comprising said caliper defining a pair of circumferentially spaced side edges confronting each one of said pair of friction elements, each one of said pair of friction elements being engageable with said pair of side edges, and each one of said pair of friction elements defining a pair of circumferentially spaced cutouts, said caliper defining two pairs of axially spaced projections aligning with said cutouts, and a pair of resilient members, each one of said pair of resilient members extending axially between one respective pair of said axially spaced projections and through one of said pair of cutouts of each friction element, said pair of resilient members releasably engaging said projections and yieldably biasing said pair of friction elements toward engagement with said pair of side edges to releasably secure said friction elements to said caliper.

* * * * *